(12) United States Patent
Vainikainen

(10) Patent No.: US 10,859,164 B2
(45) Date of Patent: Dec. 8, 2020

(54) DOUBLE MECHANICAL SEAL, A STATIONARY SLIDE RING THEREOF AND A PUMP HOUSING IN A CENTRIFUGAL PUMP

(71) Applicant: Sulzer Management AG, Winterthur (CH)

(72) Inventor: Jukka Vainikainen, Kotka (FI)

(73) Assignee: SULZER MANAGEMENT AG, Winterthur (CH)

( * ) Notice: Subject to any disclaimer, the term of this patent is extended or adjusted under 35 U.S.C. 154(b) by 0 days.

(21) Appl. No.: 16/098,056

(22) PCT Filed: May 8, 2017

(86) PCT No.: PCT/EP2017/060922
§ 371 (c)(1),
(2) Date: Oct. 31, 2018

(87) PCT Pub. No.: WO2017/202592
PCT Pub. Date: Nov. 30, 2017

(65) Prior Publication Data
US 2019/0145521 A1    May 16, 2019

(30) Foreign Application Priority Data
May 25, 2016    (EP) .................................... 16171407

(51) Int. Cl.
*F16J 15/34*    (2006.01)
(52) U.S. Cl.
CPC ....... *F16J 15/3404* (2013.01); *F16J 15/3484* (2013.01)
(58) Field of Classification Search
CPC ........ F16J 15/34; F16J 15/3404; F16J 15/342; F16J 15/3452; F16J 15/348; F16J 15/3484
See application file for complete search history.

(56) References Cited

U.S. PATENT DOCUMENTS 4,103,907 A * 8/1978 Inouye ................. F16J 15/3432
277/400
4,466,619 A * 8/1984 Adams ................... F16J 15/162
277/367

(Continued)

FOREIGN PATENT DOCUMENTS

CN    103282704 A    9/2013
CN    103782072 A    5/2014
(Continued)

OTHER PUBLICATIONS

International Search Report dated Aug. 1, 2017 in corresponding International Application No. PCT/EP2017/060922, filed May 8, 2017.

*Primary Examiner* — Kristina R Fulton
*Assistant Examiner* — L. Susmitha Koneru
(74) *Attorney, Agent, or Firm* — Global IP Counselors, LLP

(57) ABSTRACT

A double mechanical seal includes a primary stationary seal ring, a primary rotary seal ring, a secondary stationary seal ring and a secondary rotary seal ring. The primary stationary seal ring includes a slide ring and a primary carrier ring, the primary carrier ring having a first axial end with a seat for the slide ring and a second axial end with a rim opposite the first axial end. The secondary stationary seal ring includes a slide ring and a secondary carrier ring, the secondary carrier ring having an inlet recess or opening and an outlet recess or opening for a barrier fluid. The primary carrier ring has a recessed and oblong section or an oblong opening, and the inlet and outlet recesses or openings in the secondary carrier ring are arranged, when in use, in radial flow communication with the recessed and oblong section or the oblong opening.

21 Claims, 6 Drawing Sheets

(56) References Cited

U.S. PATENT DOCUMENTS

| | | | | |
|---|---|---|---|---|
| 4,744,721 A | * | 5/1988 | Villeneuve | F04D 29/128 |
| | | | | 277/350 |
| 5,072,949 A | * | 12/1991 | Lopperi | F16J 15/162 |
| | | | | 277/408 |
| 5,217,234 A | * | 6/1993 | Hornsby | F16J 15/3404 |
| | | | | 277/366 |
| 5,238,253 A | * | 8/1993 | Sieghartner | F01D 11/003 |
| | | | | 277/361 |
| 5,253,876 A | * | 10/1993 | Gardner | F16J 15/3404 |
| | | | | 277/408 |
| 5,412,977 A | * | 5/1995 | Schmohl | F16J 15/3404 |
| | | | | 73/46 |
| 5,484,267 A | * | 1/1996 | Rockwood | F16J 15/3404 |
| | | | | 137/563 |
| 8,033,549 B2 | * | 10/2011 | Huang | F16J 15/3484 |
| | | | | 277/366 |
| 2005/0077685 A1 | * | 4/2005 | Roddis | F16J 15/348 |
| | | | | 277/390 |
| 2008/0237995 A1 | * | 10/2008 | Khonsari | F16J 15/3404 |
| | | | | 277/390 |
| 2009/0212503 A1 | * | 8/2009 | Huang | F16J 15/3484 |
| | | | | 277/513 |
| 2009/0295097 A1 | * | 12/2009 | Kung | F16J 15/348 |
| | | | | 277/385 |
| 2010/0038862 A1 | * | 2/2010 | Young | F16J 15/3424 |
| | | | | 277/399 |
| 2016/0237838 A1 | * | 8/2016 | Kennedy | F01D 11/00 |

FOREIGN PATENT DOCUMENTS

| | | |
|---|---|---|
| CN | 204527382 A | 8/2015 |
| WO | 2014122015 A1 | 8/2014 |

* cited by examiner

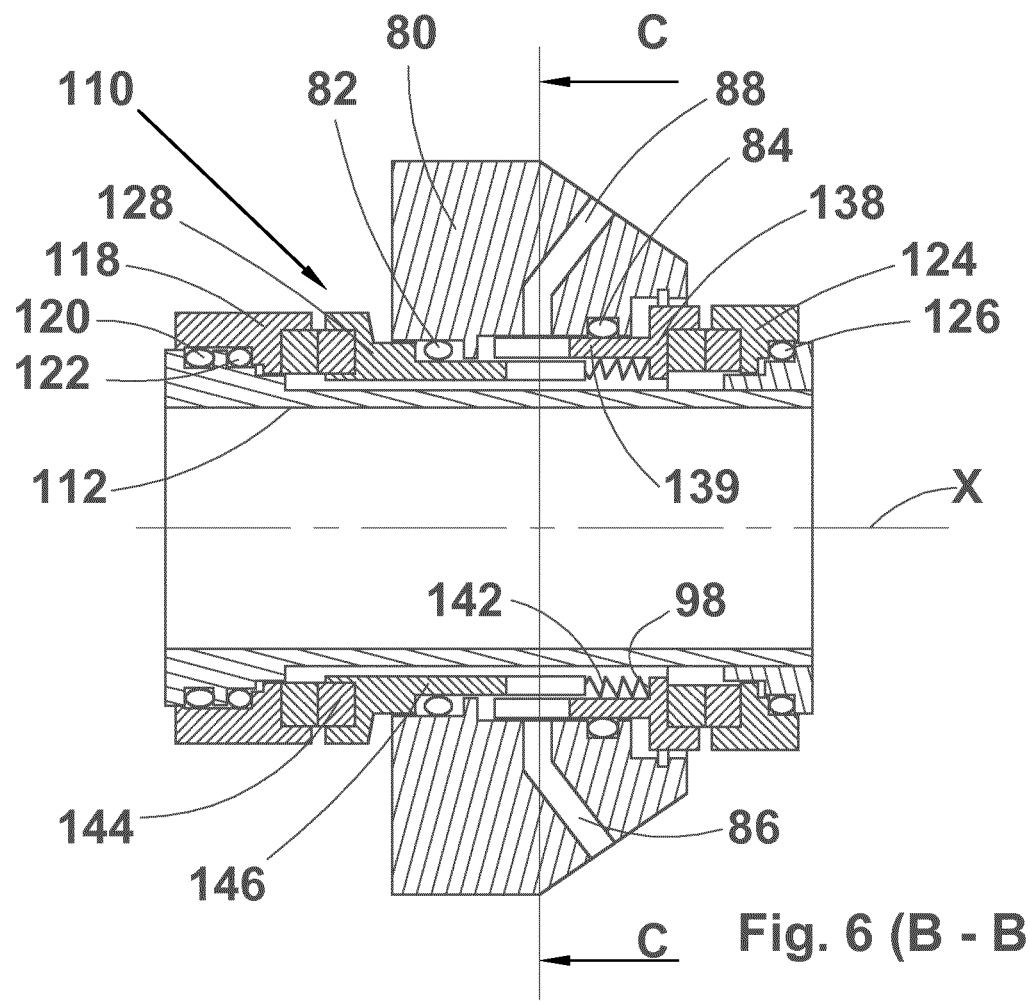
Fig. 6 (B - B)
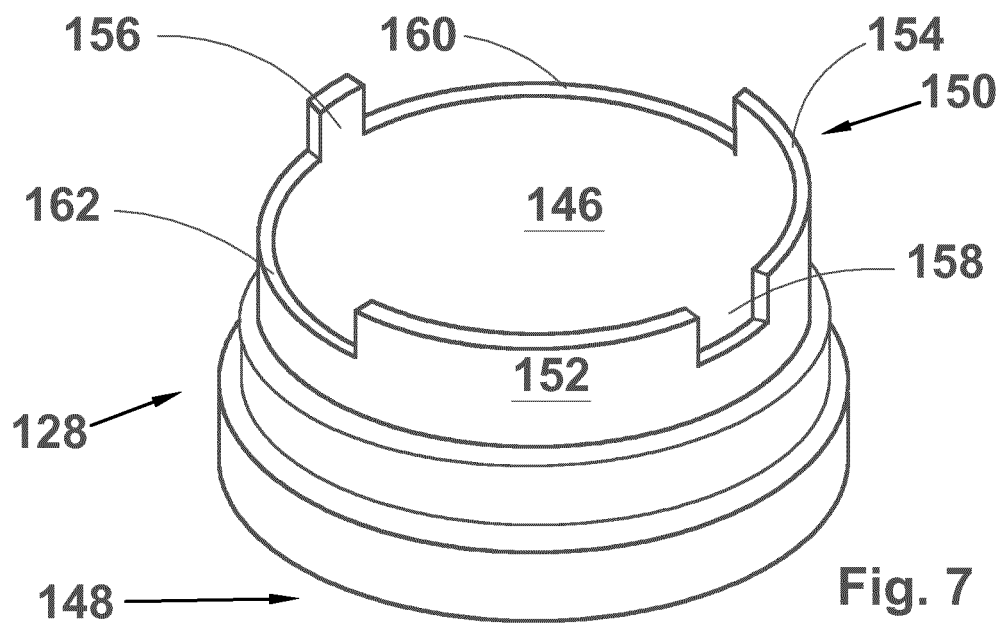
Fig. 7

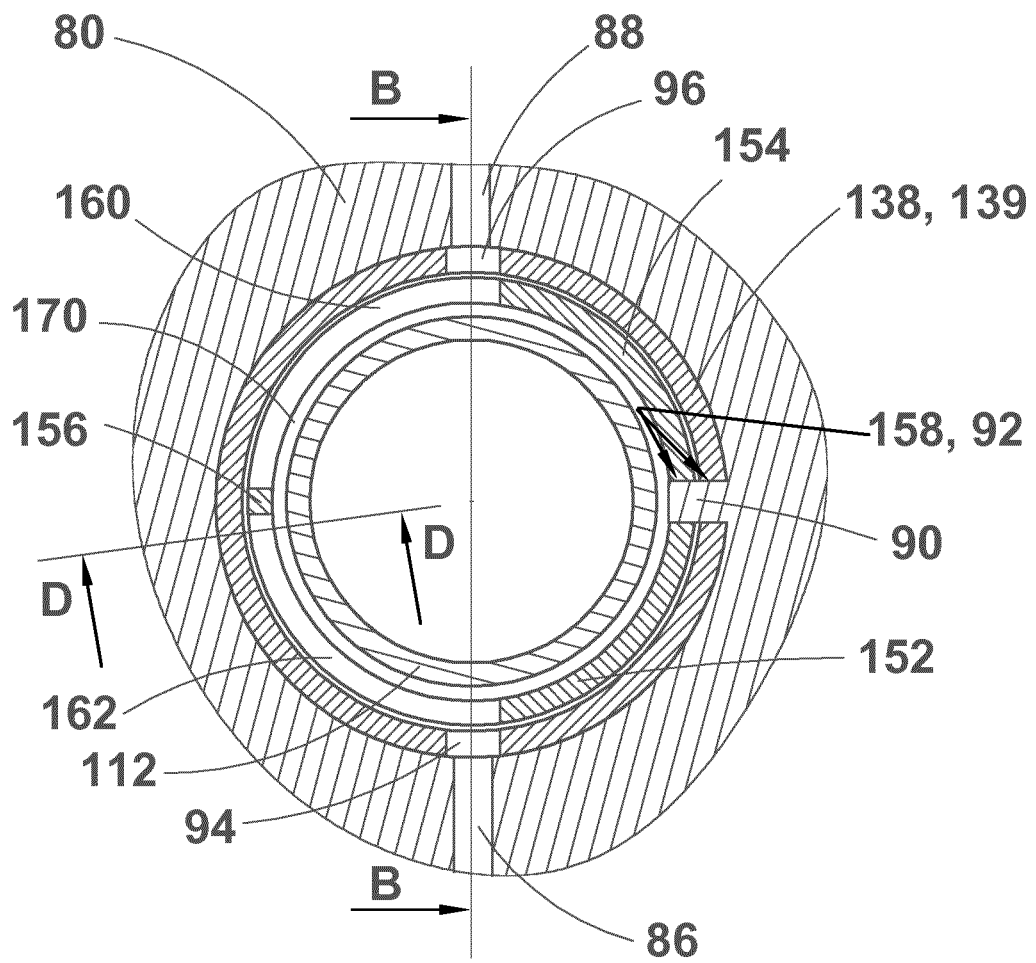
Fig. 8 (C - C)
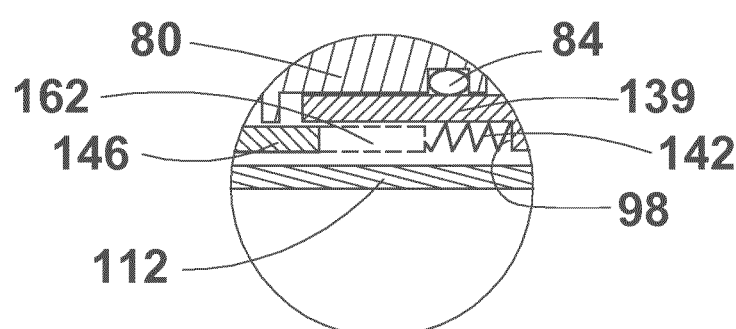
Fig. 9 (D - D)

DOUBLE MECHANICAL SEAL, A STATIONARY SLIDE RING THEREOF AND A PUMP HOUSING IN A CENTRIFUGAL PUMP

CROSS-REFERENCE TO RELATED APPLICATION

This application is a U.S. National Stage application of International Application No. PCT/EP2017/060922, filed May 8, 2017, which claims priority to European Patent Application No. 16171407.6, filed May 25, 2016, the contents of each of which are hereby incorporated herein by reference.

BACKGROUND

Field of the Invention

The present invention relates to a new kind of a double mechanical seal and a stationary slide ring thereof. The invention relates also to a pump housing in a centrifugal pump. The mechanical seals are used, for example, for sealing a shaft of a flow machine, like a centrifugal pump, a mixer, an agitator or a turbine. The present invention is especially aimed at solving problems relating to the circulation of the barrier fluid, i.e. liquid used for lubricating the sealing surfaces.

Background Information

Various types of seals used for sealing a shaft of a flow machine are known in the prior art, for example a gland packing, a slide ring seal (also known as a mechanical seal) and a dynamic seal. The two first mentioned seal types are based on closing the gap via which a leakage may occur, whereas the operation of the dynamic seal is based on creating a pressure difference capable of preventing the leakage. The dynamic seal is specifically designed for fibrous slurries, but also fits well for clean, viscous, non-fibrous slurries and liquids containing large solids. The dynamic seal does not need external sealing water and does not leak.

The present invention concerns the first mentioned seal types. The gland packing shaft seal may be used, in certain operating conditions without any specific sealing liquid, whereby a minor leakage of the liquid to be pumped is allowed to secure the proper operation of the gland packing by lubricating the sliding surfaces of the packing rings. In certain other operating conditions, for instance when viscous, fibrous and non-fibrous slurries and liquids containing large solid particles are pumped, the gland packing requires external sealing/lubrication liquid to prevent pumped liquid from entering the sealing area. In such more demanding operating conditions the gland packing seal is nowadays replaced with a slide ring seal, also called as a mechanical seal.

There are of two basic types of mechanical seals, i.e. a single mechanical seal (having a pair of slide rings) and a double mechanical seal (having two pairs of slide rings). The single mechanical seal is normally used, for instance, when fibrous slurries up to 8% consistency are pumped. The seal may be used without barrier fluid, i.e. flushing water, when pump suction head is positive and the impeller is equipped with specific balancing holes. Naturally, a single mechanical seal is also suitable for use with clean and viscous liquids and liquids containing large solids. Due to its relatively simple construction, the single mechanical seal has some limitations in its area of use.

A double mechanical seal is applied to most demanding operating conditions, i.e. it may be used for sealing the shaft of a centrifugal pump used for pumping liquids and suspension in all consistencies and concentrations. In other words, pumping of clean, viscous, fibrous slurries, non-fibrous slurries and liquids containing large solids may be performed. The pump suction head may be negative or positive and the impeller may be equipped with or without balancing holes.

The double mechanical seal generally includes two seals arranged in series. The inboard, or primary seal closer to the pump impeller keeps the medium to be pumped within the pump housing. The outboard, or secondary seal, arranged farther away from the pump impeller prevents the flush liquid or barrier fluid from leaking into the atmosphere.

Double mechanical seals are produced in two arrangements, i.e. so called back-to-back and face-to-face arrangements. In back-to-back arrangement the two rotating seal rings are arranged facing away from each other. The lubricating film is generated by the barrier fluid. This arrangement is commonly found in the chemical industry. In the case of leakage, the barrier fluid penetrates the medium to be pumped. In a face-to-face arrangement the rotary seal faces are arranged face to face and slide from the opposite direction to one or two stationary seal parts. This is a popular choice, for instance, for the food industry, particularly for products which tend to stick. In the case of leakage, the barrier fluid penetrates the medium to be pumped. If the product is considered "hot", the barrier fluid acts as a cooling agent for the mechanical seal.

In the general discussion above, barrier liquid or fluid has been mentioned. The use of such liquid is vital to the operation of a double mechanical seal, as it, on the one hand, lubricates and cools the slide surfaces, and, on the other hand, prevents the medium to be pumped from entering between the slide surfaces. For ensuring the reliability of the double mechanical seal in the most demanding operating conditions emphasis has been put on the circulation of the barrier fluid. In other words, the barrier fluid is not only introduced in the cavity between the primary and the secondary seals, but an outlet arrangement has been provided for the barrier fluid, too. Such a liquid circulation is especially needed when the seal surfaces need to be cooled whereby the barrier fluid act as a heat transfer medium.

U.S. Pat. No. 4,466,619 discusses a face-to-face double mechanical seal having two rotary slide rings and one stationary slide ring therebetween, the latter having slide surfaces at its opposite axial ends. The stationary slide ring includes a tangential inlet passage and a tangential outlet passage for circulating the barrier fluid. The two passages communicate with corresponding ducts in the gland of the seal. The circulation of the barrier fluid is ensured by arranging pumping means on the shaft, the pumping means being axially oriented grooves arranged on the outer surface of the shaft sleeve. The fluid circulation functions such that the fluid enters (or is actually pumped to) the narrow annular gap between the shaft sleeve and the gland along the tangential inlet passage. The shaft sleeve, and especially its axially oriented grooves, while rotating, maintain the barrier fluid in circumferential movement in the annular gap until the rotating fluid meets the tangential outlet passage or, naturally, the tangentially oriented outlet opening thereof. A part of the barrier fluid enters the outlet passage and is removed from the seal.

In principle the idea of circulating barrier fluid from an inlet passage to an outlet passage in the seal gland by pumping grooves arranged on the shaft or the shaft sleeve is a good one. However, it has been learned that the amount of barrier fluid flowing out along the tangential outlet passage of the construction of the above discussed US-patent is rather limited, and thus, is not, for instance, capable of transferring enough heat from the seal in severe operating conditions.

Another problem possibly relating to the construction disclosed in the above cited US-document is the provision of the tangential passages in the actual slide ring material. Such a provision of flow passages means, in practice, that the best available materials cannot be used for the slide ring as such materials are extremely hard and brittle, and may, thus, not be machined. The result is that only such materials may be used that have inferior slide properties compared to the best available ones.

U.S. Pat. No. 5,217,234 discusses quite a similar mechanical seal construction. Here, however, there are two stationary slide rings provided with a set of springs urging the slide rings away from one another. An annular gland plate is disposed between the stationary seal rings both for supporting the springs and for introducing and discharging barrier fluid to and from the sealing, The seal construction is still such that the barrier fluid has to flow along a narrow passage between the annular gland plate and the shaft or the shaft sleeve from the inlet to the outlet, whereby the flow rate and, along therewith, the heat transfer capacity remains limited.

SUMMARY

An object of the present invention is to eliminate at least one of the above mentioned problems by a novel seal structure.

Another object of the present invention is to develop a novel double mechanical seal that may be used in the most demanding environments.

A further object of the present invention is to design a novel double mechanical seal that includes such an efficient barrier fluid circulation system that a closed barrier fluid circulation may be applied if needed.

The features of the double mechanical seal, the stationary slide ring of a double mechanical seal and the pump housing in a centrifugal pump become apparent from the appended claims.

The present invention brings about a number of advantages, like for instance

More efficient barrier fluid circulation,
Simple construction of a mechanical seal,
Cost efficient construction,
A multi-purpose seal that may be used in all possible operating conditions of a flow machine,
Possibility to take into use closed barrier fluid circulation system,
Improved efficiency of the flow machine and
Due to the simple construction and, as a consequence, low price level of the double mechanical seal of the invention, the double mechanical seal may be used in all sealing applications without a need to consider the type of the seal in detail.

DESCRIPTION OF THE DRAWINGS

The invention will be explained in more detail hereinafter with reference to the drawings.

FIG. 6 illustrates schematically a radial section of a double mechanical seal in accordance with a second preferred embodiment of the present invention taken along line B-B of FIG. 8, FIG. 7 illustrates an axonometric projection of the carrier ring of the double mechanical seal of FIG. 6, FIG. 8 illustrates schematically a cross section of the double mechanical seal of the present invention taken along line C-C of FIG. 6, FIG. 9 illustrates a partial cross section of the double mechanical seal of the present invention taken along line D-D of FIG. 8.

DETAILED DESCRIPTION OF THE EMBODIMENTS

Figure 1:
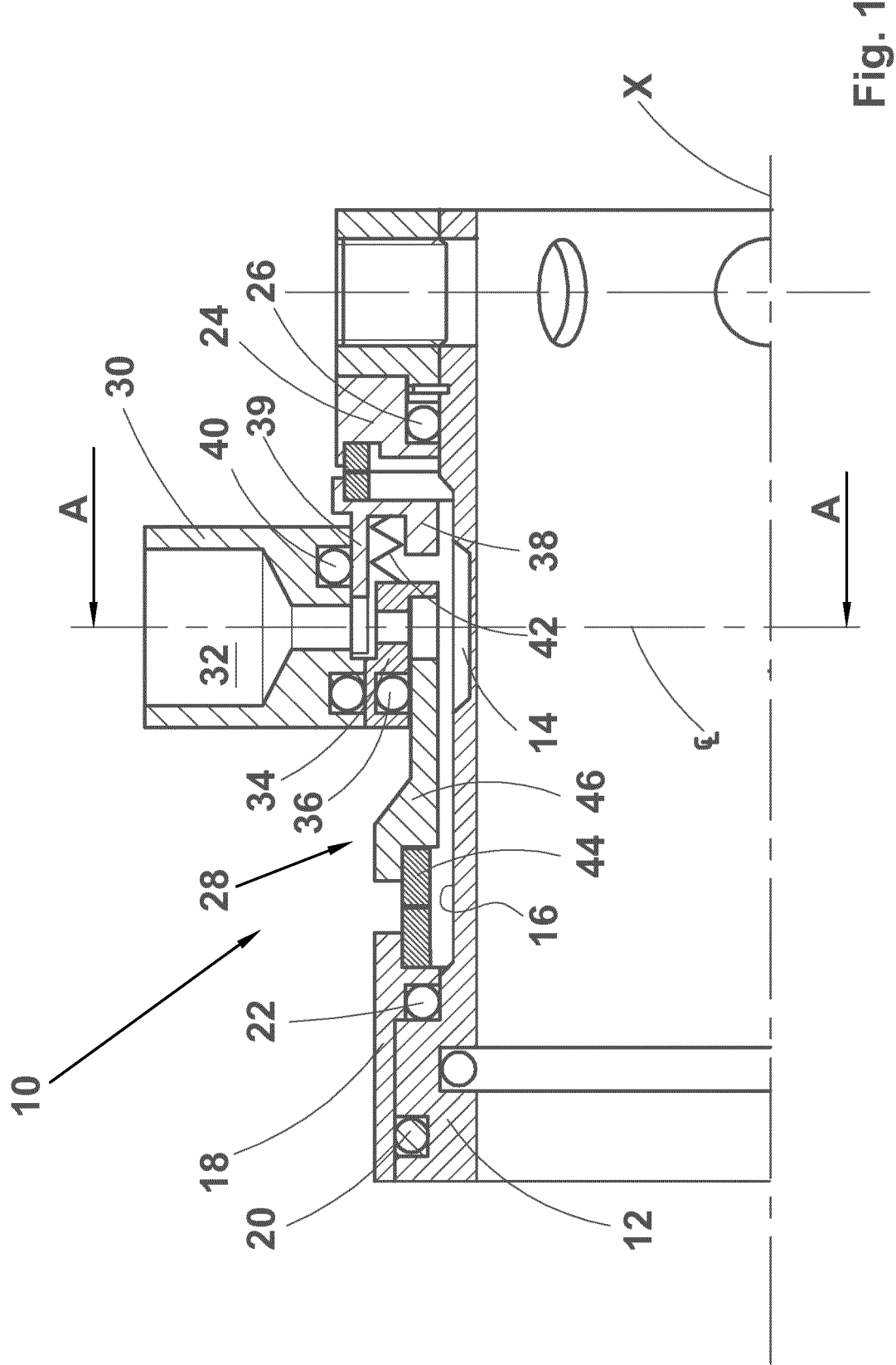
FIG. 1 illustrates schematically a radial section of a double mechanical seal in accordance with a first preferred embodiment of the present invention.

FIG. 1 illustrates schematically a radial section of a double mechanical seal 10 in accordance with a first preferred embodiment of the present invention. The double mechanical seal 10 is shown in connection with a shaft sleeve 12 that is to be arranged on the shaft such that it rotates together with the shaft. The double mechanical seal has an axis X, and the double mechanical seal 10 is coaxial with both the shaft sleeve 12 and the actual shaft. However, the double mechanical seal 10 of the present invention could as well be used or installed directly on the rotary shaft. The shaft sleeve 12 has axially extending grooves 14 in its outer surface 16. Similar grooves may also be disposed in the shaft surface if the use of the shaft sleeve is not possible or desired. The double mechanical seal 10 comprises a primary rotary seal ring 18 that is supported, in this embodiment, on the shaft sleeve 12 by O-rings 20 and 22, a secondary rotary seal ring 24 supported on the shaft sleeve 12 by an O-ring 26, and a primary stationary seal ring 28 supported to the seal gland 30, like in this Figure, via a pressure ring 34, the pressure ring 34 supporting the primary stationary seal ring 28 from outside, for instance, by an O-ring 36. The pressure ring has an axis coinciding with the axis X of the double mechanical seal. The pressure ring 34 is, on its part, supported from outside to the gland 30 comprising a barrier fluid outlet duct 32 by an O-ring. Naturally, the seal gland 30 also includes an inlet duct (not shown) in addition to the outlet duct 32 for the barrier fluid. The double mechanical seal 10 further comprises a secondary stationary seal ring 38 supported directly to the seal gland 30 via an O-ring 40. The secondary stationary seal ring 38 has a carrier ring 39, which extends between the pressure ring 34 and the seal gland 30.

The carrier ring 39 may extend in front of the barrier fluid outlet opening such that the carrier ring 39 or the rim thereof has to include an opening or recess for enabling the entrance of the barrier fluid into the outlet duct 32. The stationary nature of the primary and secondary stationary seal rings 28, 38 is, for instance, ensured by at least one drive pin (not shown) or a corresponding fixed or removable element extending from the seal gland 30 to at least one of the stationary seal rings 28, 38. However, both stationary seal rings may have, for instance, tooth-like projections mating to one another such that it is sufficient to have only one of the stationary seal rings, i.e. in FIG. 1 the secondary stationary seal ring, including the drive pin, the tooth like projections preventing the other stationary seal ring from rotating. Thus, the secondary stationary seal ring 38 has at least one recess or opening for the drive pin or alike in or in the nearhood of its rim opposite the rim having the seal surface. Also, the same rim, i.e. the rim opposite the rim having the seal surface, may include recesses or openings for communicating the barrier fluid inlet and outlet ducts in the gland, provided that the rim extends in axial direction in front of the openings to the inlet and outlet ducts in the gland. And finally, a spring or a set of springs (depending on the spring type) 42 is arranged between the primary and secondary stationary seal rings 28, 38 to push the stationary seal rings 28, 38 towards the rotary seal rings 18, 24 such that the seal surfaces are in constant contact with one another. The spring(s) 42 may be either in direct communication with the stationary seal rings, or by some other element, like, for instance, by the pressure ring 34 as shown in FIG. 1.

The double mechanical seal of the present invention is usually assembled in connection with the shaft sleeve 12 such that, referring to FIG. 1, the two leftmost O-rings 20 and 22 are inserted in place on the shaft sleeve 12 whereafter the rotary seal ring 18 and the stationary seal ring 28 are installed on the shaft sleeve 12. Thereafter the pressure ring 34 is provided with the O-ring 36 and is pushed on the primary stationary seal ring 28. Next the gland 30 is provided with the two O-rings and the gland 30 is pushed on the pressure ring 34. Then the secondary stationary seal ring 38 is provided with the spring(s) 42 and the seal ring 38 is installed within the gland 30, the spring(s) resting against the pressure ring 34. Next the secondary rotary seal ring 24 is provided with the O-ring 26 and pushed on the shaft sleeve 12. And finally a locking ring is installed on the shaft sleeve 12 and locked in place on the shaft sleeve 12 by one or more locking screws. In the above described manner a seal cartridge is formed, the cartridge being, when the seal is taken in use, fastened to the end of the pump housing using bolts extending through the seal gland 30.

The present invention relates, for the most part, to the detailed construction of the primary stationary seal ring 28, which comprises a slide ring 44 attached to the primary carrier ring 46. The primary carrier ring 46 is normally manufactured of metal that is chosen to withstand the corrosion subjected thereto from the liquids that may get into contact with the primary carrier ring 46.

Figure 2:
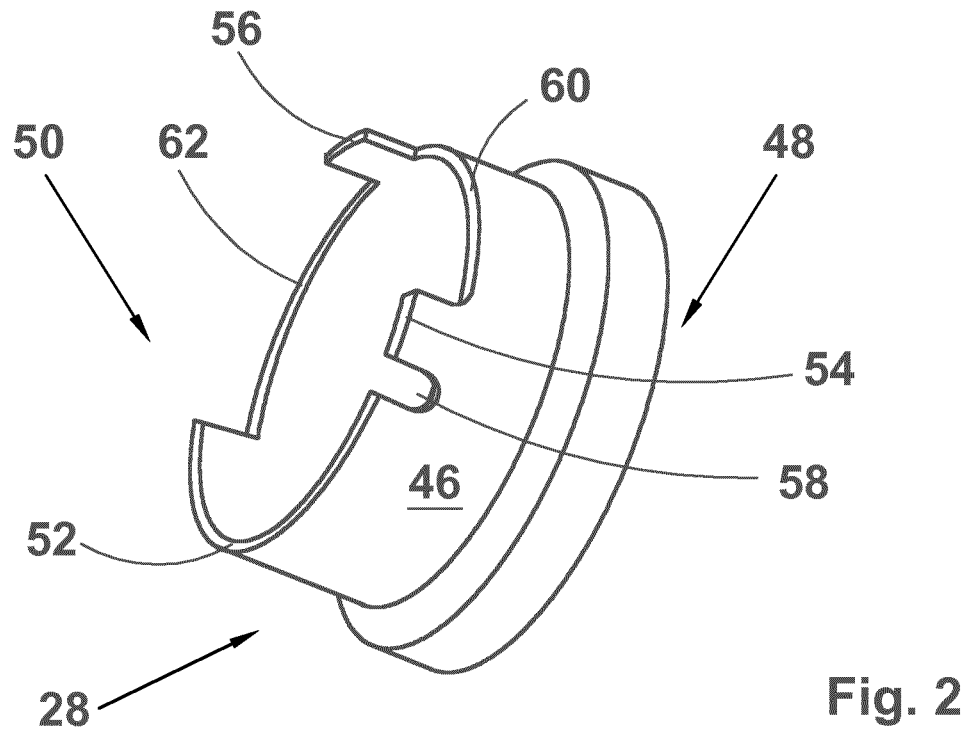
FIG. 2 illustrates an axonometric projection of the carrier ring of the double mechanical seal of FIG. 1.
Figure 3:
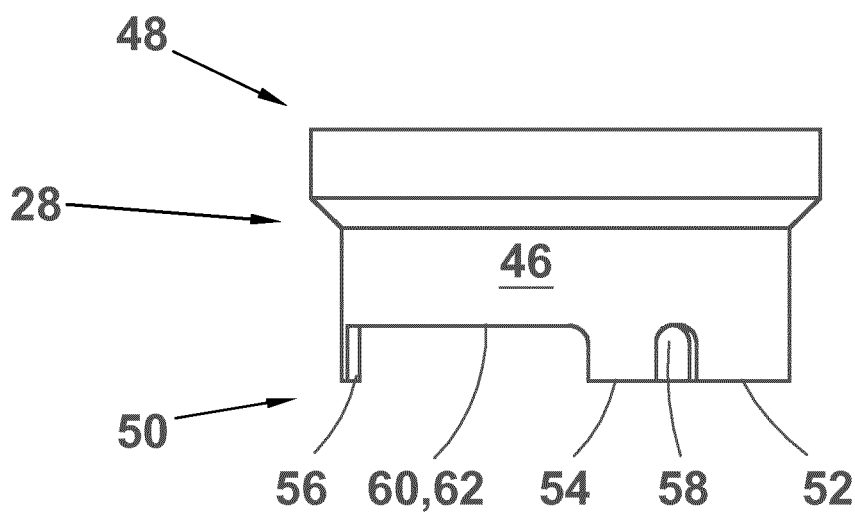
FIG. 3 illustrates schematically a side view of the carrier ring of the double mechanical seal of FIG. 1.
Figure 4:
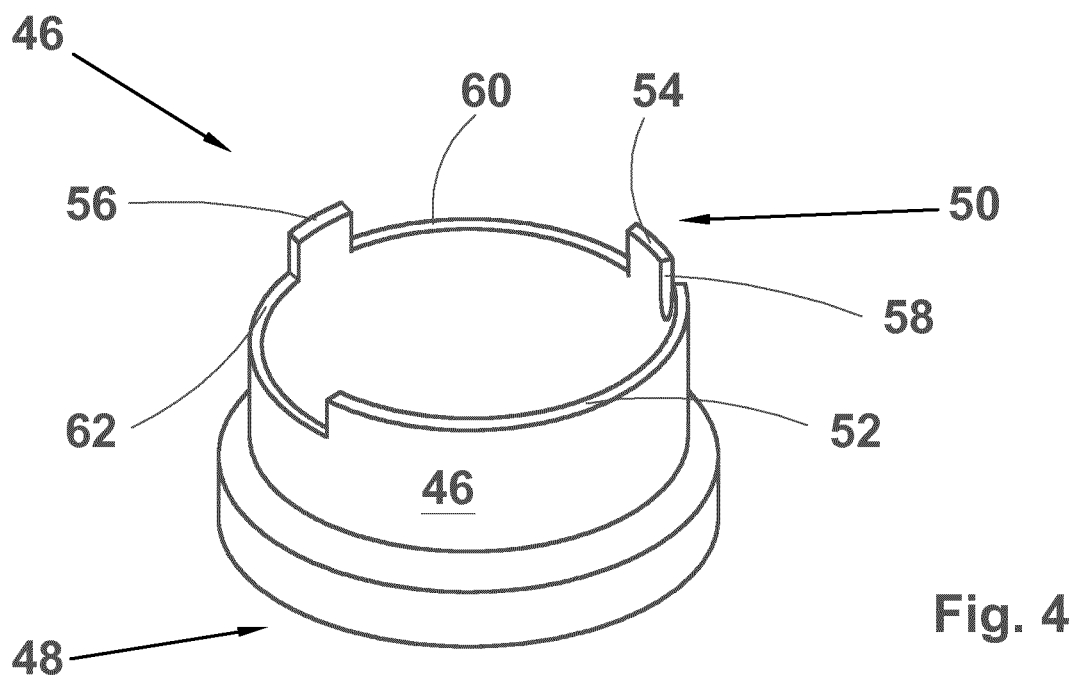
FIG. 4 illustrates another axonometric projection of the carrier ring of the double mechanical seal of FIG. 1.

FIGS. 2-4 discuss in detail the construction of the carrier ring 46 of the primary stationary seal ring 28. The carrier ring 46 is, for the most part thereof, rotationally symmetric and has two axial ends, a first end 48 having a seat (not shown) for the slide ring (shown in FIG. 1), and a second end 50 for direct or indirect communication with the spring(s) 42 (shown in FIG. 1). The second end 50 of the carrier ring 46 has, in this embodiment of the present invention, an annular rim with three axially full-length sections 52, 54 and 56 extending farthest away from the first end 48 of the carrier ring 46 for communication either directly or indirectly by, for instance, pressure ring 34 (see FIG. 1) with the spring(s), and three in an axial direction recessed sections 58, 60 and 62 having other tasks. The substantially narrow first in an axial direction recessed section 58, or axially extending recess, in the second end 50 of the carrier ring 46 is provided for communication with the above mentioned drive pin or alike to prevent the primary stationary seal ring 28 from rotating along with the primary rotary seal ring. Such a recess 58 may be replaced with an opening in the carrier ring 46 in case the drive pin or alike is removable and may be installed after the installation of the primary stationary seal ring 28 within the gland. However, as was mentioned already above, the primary stationary seal ring need not necessarily have such a drive pin for keeping it stationary, whereby the recessed section 58 may not be needed at all, or it may have another shape and size and location and be in communication with other kinds of means or devices for keeping the seal ring stationary. The wider, i.e. oblong in circumferential direction, second and third recessed sections 60 and 62, facilitate the barrier fluid circulation as will be discussed later on in connection with FIG. 5. The word 'oblong' is here understood as a shape having the widest dimension at least two, preferably at least 3, 4, 5 or 6 times the narrowest dimension. The wider in an axial direction recessed sections 60 and 62 cover together between about 60 and 300 degrees of the entire rim of the second end 50 of the carrier ring 46. The wider share of the rim of the second end 50 of the carrier ring 46 the recessed sections 60 and 62 cover, the greater number of relatively narrow axially full-length sections 56 (here only one is shown), which extend to the full axial length of the carrier ring 46, is needed between the recessed sections to ensure that the pressure subjected to the carrier ring 46 from the spring(s), either directly or via some intermediate means or device, like a pressure ring 34 of FIG. 1, is evenly divided along the whole rim of the second end 50 of the carrier ring 46. By even distribution of spring pressure to the rim of the carrier ring 46 it is ensured that the carrier ring 46 and, naturally, the primary stationary seal ring 28, maintains its correct position, i.e. having its axis running along the axis of the shaft to be sealed, and moves in the axial direction with little effort. Naturally, if the circumferential width of the recessed sections is small, i.e. of the order of 60-90 degrees, and the type of spring(s), for example a wave spring, or the intermediate member (here pressure ring) is appropriate there may be no need for any full-length section 56 located somewhere within the recessed sections.

Figure 5:
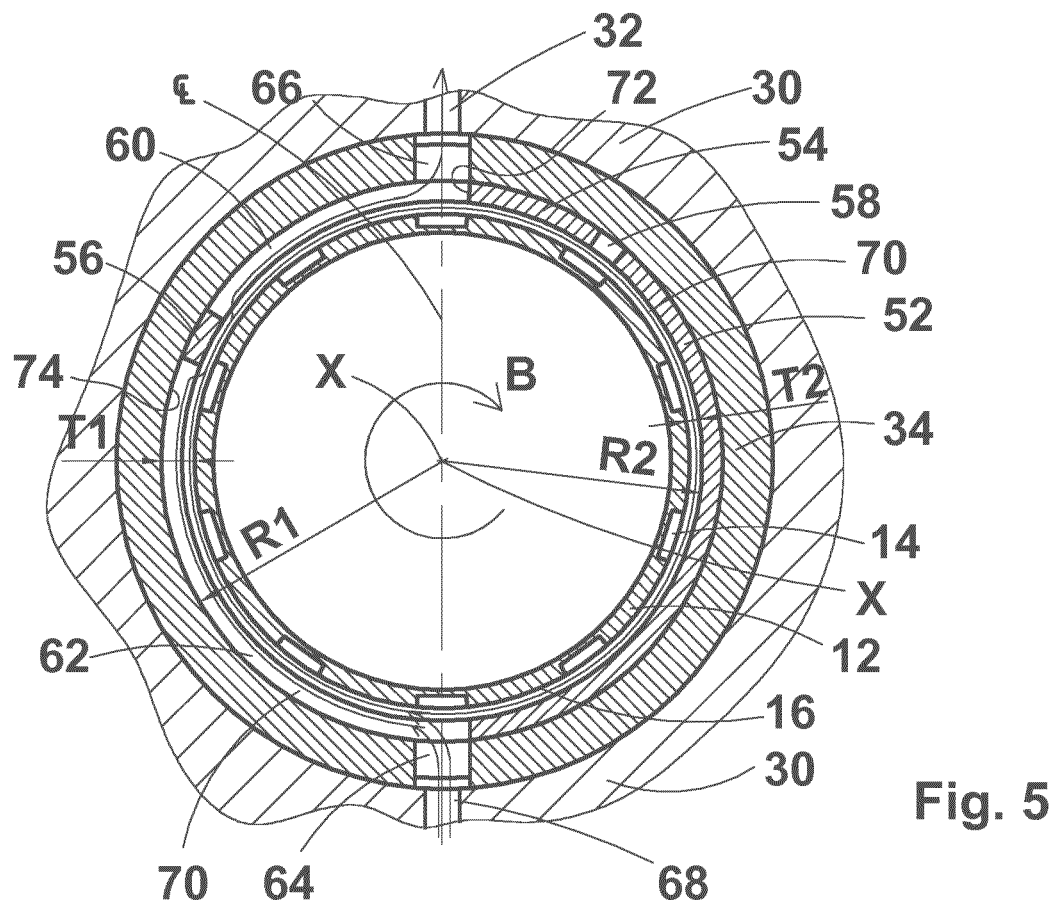
FIG. 5 illustrates schematically a cross section of the double mechanical seal taken along line A-A of FIG. 1.

FIG. 5 discusses the operation of the carrier ring 46 (shown by its axially full-length sections 52, 54 and 56) of the present invention in a cross-section A-A (at right angles to the axis of the double mechanical seal as well as to the axis of the pressure ring) of FIG. 1. The carrier ring is located, as is already shown in FIG. 1, between the shaft sleeve 12 (or the shaft) and the pressure ring 34. The pressure ring 34 has an inlet passage 64 and an outlet passage 66 for the barrier fluid. The inlet passage 64 communicates with a corresponding inlet duct 68 in the seal gland 30, and the outlet passage 66 communicates with the outlet duct 32 arranged to the seal gland 30 (see FIG. 1). The outlet passage 66 has a centreline CL, which, preferably, but not necessarily, is common with that of the outlet duct 32. In a specific embodiment the centreline CL is common with that of the inlet passage 64 and the inlet duct 68, too. However, such an arrangement is by no means necessary. As further variations of the present invention may be mentioned such constructions that the inlet and/or outlet passage(s) may be inclined or tangential. The same options apply to the inlet and outlet ducts, too. Preferably, but not necessarily, the centreline CL is located in a plane running via the axis X of the double mechanical seal 10 or of the pressure ring 34 at right angles to the axis X. The shaft sleeve 12 rotates (together with the shaft) in the direction of the arrow B, whereas the rest of the elements shown in the drawing are stationary. The rotary shaft sleeve 12 and the stationary elements outside thereof leave an annular cavity 70 therebetween for the barrier fluid. The annular cavity 70 has a first radial dimension T1 between the shaft sleeve 12 and the pressure ring 34 and a first outer radius R1, which may also be called as the first internal radius R1 of the pressure ring 34, and a second radial dimension T2 between the shaft sleeve 12 and the full-length sections 52, 54 and 56 of the carrier ring 46 and a second outer radius R2, which may also be called as the second internal radius R2 of the pressure ring 34. The first dimension T1 being, naturally, longer than the second one T2, the difference corresponding to the radial thickness of the carrier ring 46. The same difference applies to the outer radii of the cavity, which radii may also be called as the inner radii of the stationary elements, i.e. pressure ring and the carrier ring, of the double mechanical seal 10. The thin arrows and lines show the circulation of the barrier fluid in the annular cavity 70. The barrier fluid enters the annular cavity 70 via the inlet duct 68 in the gland 30 and the inlet passage 64 in the pressure ring 34, which introduces the barrier fluid to the recessed section 62 having the first radial dimension T1 and radius R1. In other words, the inlet passage 64 is in radial flow communication with the recessed section 62, i.e. the recessed section 62 is located radially inside the inlet passage 64. In the recessed and oblong, in circumferential direction, section 62 the barrier fluid is mixed with the part of the barrier fluid entering the area of the inlet opening 64 from the right, i.e. from the annular cavity from between the shaft sleeve 12 and the full-length section 52 of the carrier ring 46. The barrier fluid flows along with the rotary shaft sleeve 12 (or shaft) and is pumped by the grooves 14 of the shaft sleeve 12 (or shaft) clockwise forward. In case there is one or more full-length spring(s) within the recessed spring(s) the barrier fluid moves up to the full-length section 56 where the full-length section 56 forces the barrier fluid to pass through the annular cavity having a smaller radial dimension T2 between the full-length section 56 and the shaft sleeve 12 (or shaft) and radius R2. Thereafter the barrier fluid is, again, able to spread to the cavity 70 having the first radial dimension, i.e. to the in an axial direction recessed section 60, and flows, again clockwise up to the outlet passage 66 in the pressure ring 34. The outlet passage 66 is located in relation to the in an axial direction recessed section 60 in such a position that the centreline CL of the outlet passage runs via the recessed and oblong, in circumferential direction, section 60, whereby the edge or front wall 72 of the full-length section 54 of the carrier ring 46 is located in front of the outlet passage 66, in fact at the, in the fluid flow direction, downflow side thereof so that the abrupt reduction in the radial dimension of the annular cavity from the first one T1 to the second one T2 or the radius of the pressure ring from R1 to R2 downstream of the opening to the outlet passage 66 prevents the barrier fluid from continuing its circumferential flow along the inner rim 74 or the inner surface of the pressure ring 34 having radius R1. In other words, the edge or wall 72 results in the increase in the pressure in front of or at the inlet opening to the outlet passage 66 in the inner surface 74 of the pressure ring facilitating the barrier fluid discharge from between the shaft sleeve 12 and the pressure ring 34. Thus, the outlet passage 66 is in radial flow communication with the recessed section 60. In the above, the phrase "in front of the outlet passage" should be understood such that, preferably, the edge 72 and the outlet passage 66 are positioned mutually such that a line drawn on the, in circumferential flow direction, latter or the right hand side of the outlet passage 66 in FIG. 5 coincides with the edge 72. However, it should be understood that, in practice, the same result is achieved even if the position of the edge 72 is slightly moved to the left or to the right from that shown in FIG. 5 and discussed above.

In view of the above, it should be understood that the function similar to the above described may be accomplished by arranging elements corresponding to the recessed sections of the carrier ring in the internal surface of the pressure ring, too. In other words, in such a case, the carrier ring could be made shorter, i.e. its axial length would correspond to the axial length of the carrier ring of FIGS. 2-4 measured from its recessed sections, and either the originally cylindrical internal surface of the pressure ring having a second internal radius R2 could be either machined to have radial depressions corresponding to the recessed sections of the carrier ring of FIGS. 2-4, or the pressure ring having an originally cylindrical internal surface with a first internal radius R1 could be provided with a separate member corresponding to the full-length sections of the carrier ring of FIGS. 2-4.

FIG. 6 illustrates schematically a radial section of a double mechanical seal 110 in accordance with a second preferred embodiment of the present invention. The second embodiment differs somewhat from the first one. Firstly, while the first embodiment has a separate gland to which the primary stationary seal rings is supported and by which the seal is fastened or coupled to the pump housing, in the embodiment of FIG. 6 the stationary seal rings 128 and 138 are supported directly to the pump housing 80, i.e. without a pressure ring and a gland. Secondly, a separate pressure ring used in the first embodiment is not needed in the second embodiment, as the spring is arranged directly between the carrier rings 146 and 139 of the stationary seal rings 128 and 138. Thirdly, due to the lack of pressure ring the barrier fluid circulates along the internal surface of the carrier ring 139 of the outer stationary seal ring 138.

The double mechanical seal 110 is shown in connection with a shaft sleeve 112 that is to be arranged on the shaft such that it rotates together with the shaft. The double mechanical seal has an axis X, and the double mechanical seal 110 is coaxial with both the shaft sleeve 112 and the actual shaft. However, the double mechanical seal 110 of the present invention could as well be used or installed directly on the rotary shaft. The shaft sleeve 112 may have axially extending grooves in its outer surface, but in favourable conditions the surface of the shaft sleeve or the shaft may be smooth. The double mechanical seal 110 comprises a primary rotary seal ring 118 that is supported, in this embodiment, on the shaft sleeve 112 by O-rings 120 and 122, a secondary rotary seal ring 124 supported on the shaft sleeve 112 by an O-ring 126, a primary stationary seal ring 128 supported axially slidably to the rotationally symmetrical opening for the seal and the shaft of the pump in the pump housing 80 by an O-ring 82, and a secondary stationary seal ring 138 supported directly and axially slidably to the same opening in the pump housing 80 via an O-ring 84. The stationary nature of the primary and secondary stationary seal rings 128, 138 is, for instance, ensured by at least one tooth-like projection (shown in FIG. 7) extending inwardly from the pump housing 80 to an opening or recess disposed in at least one of the stationary seal rings 128, 138. Both stationary seal rings may have, for instance, tooth-like projections mating to one another such that it is sufficient to have only the outer one of the stationary seal rings, i.e. the secondary stationary seal ring 138, including the opening or recess for the tooth-like projection of the pump housing 80, the tooth like projections of the stationary seal rings preventing the primary stationary seal ring 128 from rotating. And finally, a spring or a set of springs 142, preferably a so called wave spring, is arranged between the primary and secondary stationary seal rings 128, 138 to push the stationary seal rings 128, 138 towards the rotary seal rings 118, 124 such that the seal surfaces are in constant contact with one another. In this embodiment, the pump housing 80 includes an inlet duct 86 and an outlet duct 88 for the barrier fluid.

The double mechanical seal of the second embodiment of the present invention is usually assembled in connection with the shaft sleeve 112, referring to FIG. 6, as follows. First, the shaft opening in the pump housing 80 is provided with the O-ring 84. Then, the secondary stationary seal ring 138 is provided with the spring 142, the spring being supported axially against shoulder 98 and extending along the inner surface of the carrier ring 139. Thereafter, the secondary stationary seal ring 138 is installed in the shaft opening in the pump housing 80 within the O-ring 84. Next, the primary stationary seal ring 128 is provided with the O-ring 82 and installed in the shaft opening in the pump housing 80 such that the carrier ring 146 of the primary stationary seal ring 128 is positioned inside the carrier ring 139 of the secondary stationary seal ring 138 and the spring 142 is resting against the rim of the carrier ring 146 of the primary rotary seal ring 118. Then, the two leftmost O-rings 120 and 122 are inserted in place on the shaft sleeve 112, the primary rotary seal ring 118 is installed on the shaft sleeve 112 and the shaft sleeve 112 is pushed inside the primary stationary seal ring 128 in the pump housing 80 such that the slide surfaces of the primary seal rings abut one another. Next the secondary rotary seal ring 124 is pushed on the shaft sleeve 112 the seal or slide surface thereof abutting against the seal or slide surface of the secondary stationary seal ring 138. And finally a locking ring is installed on the shaft sleeve 112 to press the secondary rotary seal ring 124 towards the primary seal rings and to ensure appropriate spring pressure between the slide surfaces, whereafter the locking ring is locked in place on the shaft sleeve 112 by one or more locking screws. In the above described manner the double mechanical seal of the second preferred embodiment of the present invention is coupled directly to the pump housing 80.

The second preferred embodiment of the present invention relates for the most part to the detailed construction of the primary stationary seal ring 128, which comprises a slide ring 144 attached to the primary carrier ring 146. The primary carrier ring 46 is normally manufactured of metal that is chosen to withstand the corrosion subjected thereto from the liquids that may get into contact with the primary carrier ring 146. The primary carrier ring 146 of this embodiment is, for the most parts, equal with the carrier ring discussed in FIGS. 2-4. In other words, FIG. 7 illustrates the primary carrier ring 146 of the primary stationary seal ring 128, the carrier ring 146 having two axial ends, a first end 148 having a seat (not shown) for the slide ring (shown in FIG. 6), and a second end 150 for indirect communication with the spring(s) 142 (shown in FIGS. 6 and 9). The second end 150 of the carrier ring 146 has, in this embodiment of the present invention, an annular rim with three axially full-length sections 152, 154 and 156 extending farthest away from the first end 148 of the carrier ring 146 for communication directly with the spring(s) 142, and three in an axial direction recessed sections 158, 160 and 162 having other tasks. The first, in an axial direction, recessed section 158, or axially extending recess, in the second end 150 of the carrier ring 146 is provided to communicate with the element (shown in more detail in FIG. 8) used for preventing the primary stationary seal ring from rotating along with the primary rotary seal ring. Such a recess 158 may be replaced with an opening in the carrier ring 146 in case the drive pin or alike is a removable one and may be installed after the installation of the primary stationary seal ring within the pump housing. However, as was mentioned already above, the primary stationary seal ring need not necessarily have such a drive pin for keeping it stationary, whereby the recessed section 158 may not be needed at all, or it may have another shape and size and location and be in communication with other kinds of means or devices for keeping the seal ring stationary. The wider second and third recessed and oblong, in circumferential direction, sections 160 and 162, facilitate the barrier fluid circulation in the manner discussed earlier in connection with FIG. 5 and will be discussed later on in connection with FIG. 8. The wider in an axial direction recessed sections 160 and 162 cover together between about 60 and 300 degrees of the entire rim of the second end 150 of the carrier ring 146. The wider share of the rim of the second end 150 of the carrier ring 146 the recessed sections 160 and 162 cover, the greater number of relatively narrow axially full-length sections 156 (here only one is shown), which extend to the full axial length of the carrier ring 146, is needed between the recessed sections to ensure that the pressure subjected to the carrier ring 146 from the spring(s) is evenly divided along the whole rim of the second end 150 of the carrier ring 146. By even distribution of pressure to the rim of the carrier ring 146 it is ensured that the carrier ring 146, and naturally the primary stationary seal ring 128, maintains its correct position, i.e. having its axis running along the axis of the shaft to be sealed, and moves in the axial direction with little effort. Naturally, if the circumferential width of the recessed sections is small, i.e. of the order of 60-90 degrees, and the type of spring(s), for example a wave spring, appropriate there may be no need for any full-length section 156 located somewhere within the recessed sections 160 and 162.

FIG. 8 illustrates the cross section of the double mechanical seal in accordance with the second preferred embodiment of the present invention. With regard to the operation of the seal the discussion in connection with the FIG. 5 embodiment is referred to. As to the features differing from those of FIG. 5 or not discussed in FIG. 5, the cross section of FIG. 8 shows a tooth-like protrusion 90 extending from the pump housing 80 inwardly to recesses 158 and 92 disposed in the carrier rings of both the primary and secondary stationary seal rings. The Figure also shows how the cavity 170 in which the barrier fluid flows from the inlet duct 86 towards the outlet duct 88 is formed between the shaft or shaft sleeve 112 and the secondary stationary seal ring 138. Further, FIG. 8 shows an inlet recess or opening 94 and an outlet recess or opening 96 in the secondary carrier ring 139 of the secondary stationary seal ring 138 for providing, for the barrier fluid, flow communication between the inlet duct 86 and the outlet duct 88 along the recessed sections 160 and 162. Also, like in the first preferred embodiment, both the inlet and outlet recesses or openings 94 and 96 are in radial flow communication with the recessed sections 162 and 160, i.e. the recessed sections are located radially inside the inlet and outlet recesses or openings.

FIG. 9 illustrates a partial cross section along line D-D of FIG. 8. The Figure shows clearly how the carrier rings 146, 139 of the primary and secondary stationary seal rings overlap and how the recessed section 162 is open between the shaft sleeve 112 and the secondary stationary seal ring 138. It is also shown that the spring 142, preferably, but not necessarily a wave spring or so called coiled wave spring, rests on the shoulder 98 of the secondary stationary seal ring 138. The dashed lines show the carrier ring 146 in its full length outside the recessed sections of the carrier ring.

Figure 10:
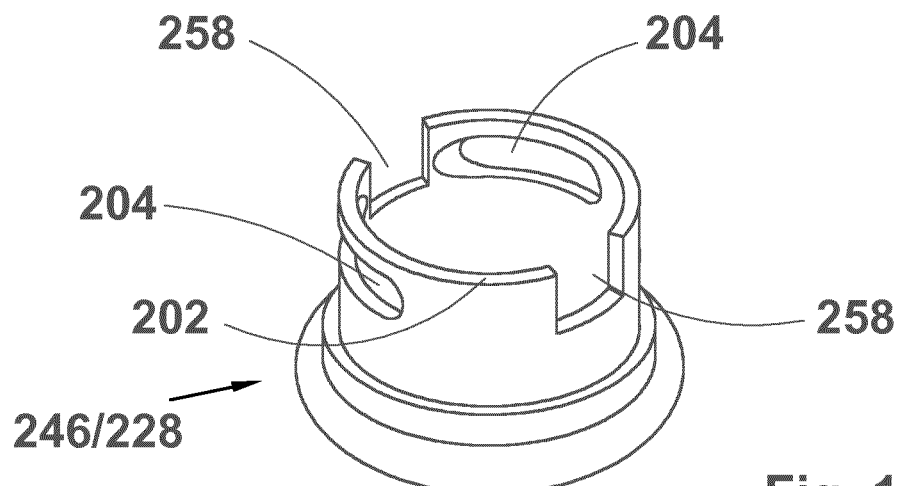
FIG. 10 illustrates an axonometric projection of a variation of the carrier ring of the double mechanical seal of FIG. 6.

FIG. 10 illustrates a variation of the carrier ring of the primary stationary seal ring 228. The carrier ring 246 has, at its rim 202 opposite the seal ring, two opposite recesses 258 for the element protruding from the pump housing for preventing the primary stationary seal ring 228 from rotating along with the primary rotary seal ring. The carrier ring 246 also includes two oblong (in circumferential direction) openings 204 for the barrier fluid. The oblong openings 204 cover from about 60 to about 300 degrees of the circumference of the carrier ring 246. In other words, now the carrier ring 246 is designed to extend past the openings for the barrier fluid in the pump housing, whereby the rim 202 of the carrier ring 246 remains intact for the most part of its circumference. This kind of structure ensures even spring pressure to the carrier ring 246.

Figure 11:
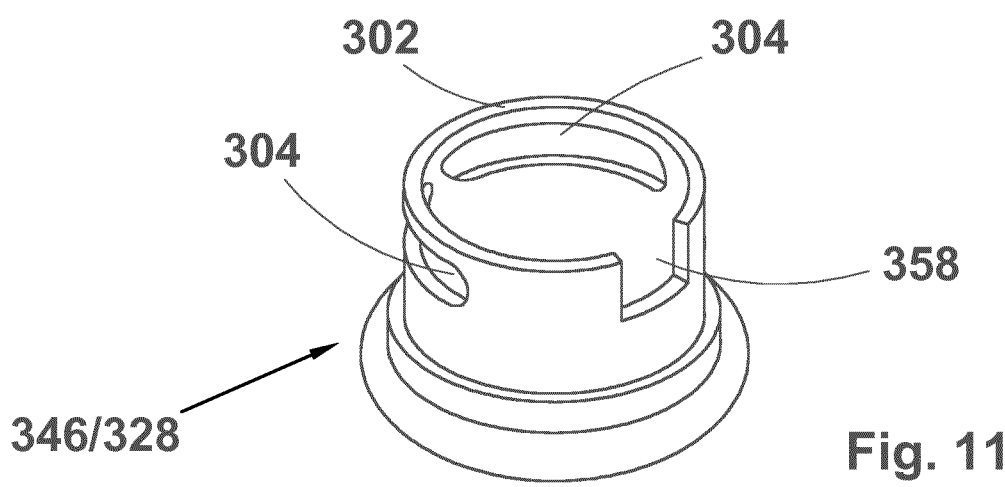
FIG. 11 illustrates an axonometric projection of a further variation of the carrier ring of the double mechanical seal of FIG. 6.

FIG. 11 illustrates a further modification to the carrier ring 346 of the primary stationary seal ring 328. Compared to the carrier ring of FIG. 10, the other recess 258 has been left out so that the rim 302 may extend almost for the entire circumferential length of the carrier ring 346. This means, in practice, that the land area between the oblong openings 304 is shorter resulting in reduction in flow losses in the flow of the barrier fluid. Yet another option is to leave the land area away entirely by merging the two oblong openings into one long opening in the carrier ring. The oblong opening(s) 304 cover from about 60 to about 300 degrees of the circumference of the carrier ring 346. Such a construction makes it possible for the barrier fluid flow from the inlet to the outlet in the pump housing without any intermediate obstructions.

Figure 12:
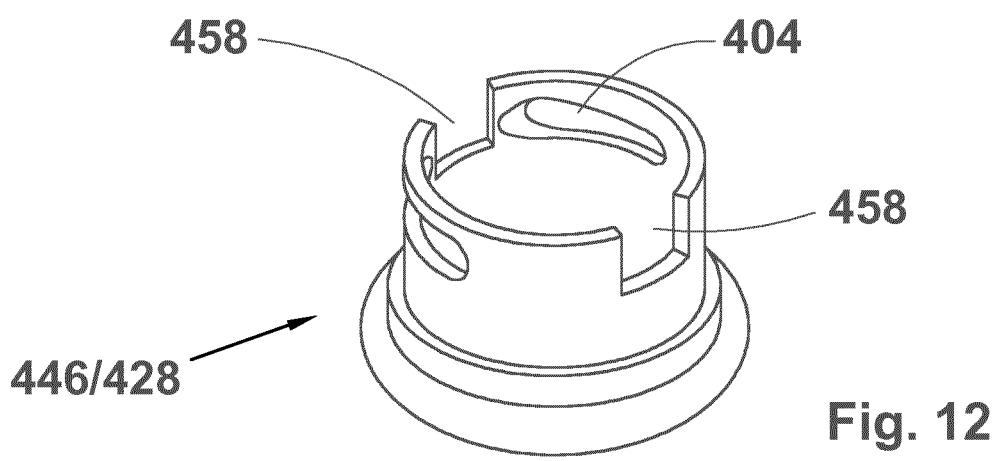
FIG. 12 illustrates an axonometric projection of another further variation of the carrier ring of the double mechanical seal of FIG. 6.

FIG. 12 illustrates another further modification to the carrier ring 446 of the primary stationary seal ring 428. Compared to the carrier ring of FIG. 10, the only difference may be seen in the shape of the oblong opening 404, which is now tapering towards the outlet opening in the pump housing. The oblong opening(s) 404 cover from about 60 to about 300 degrees of the circumference of the carrier ring 446. This kind of construction reduces further the resistance to flow of the barrier fluid in the seal. Naturally, the constructions discussed in connection with FIG. 11 may be applied here, too, i.e. the other recess 458 may be left out as well as the land area between the oblong openings.

As to the carrier rings discussed in connection with FIGS. 7, 10-12 it should be understood that they are applicable also in seals having the pressure ring discussed in connection with FIGS. 1-5.

As may be seen from the above description it has been possible to develop a slide ring seal, which is very simple of its construction yet capable performing its task as well as any other much more complicated mechanical seal. While the present invention has been herein described by way of examples in connection with what are at present considered to be the most preferred embodiments, it is to be understood that the invention is not limited to the disclosed embodiments, but is intended to cover various combinations and/or modifications of its features and other applications within the scope of the invention as defined in the appended claims. With regard to the appended claims it has to be understood that the claims use a word 'gland' by which all elements, parts, housings, casings or casing covers, generally understood as points of application, to which the slide ring seal is to be fastened are covered.

The invention claimed is:

1. A double mechanical seal comprising:
two pairs of seal rings having slide or seal surfaces, a first pair of the seal rings including a primary stationary seal ring and a primary rotary seal ring, a second pair of the seal rings including a secondary stationary seal ring and a secondary rotary seal ring; and
at least one spring arranged and configured to push, when in use, the primary and the secondary stationary seal rings in opposite directions against the primary and secondary rotary seal rings,
the primary stationary seal ring comprising a slide ring and a primary carrier ring, the primary carrier ring having a first axial end with a seat for the slide ring and a second axial end with a rim opposite the first axial end, and the secondary stationary seal ring comprising a slide ring and a secondary carrier ring, the secondary carrier ring having an inlet recess or opening and an outlet recess or opening for a barrier fluid, the primary carrier ring having at least one recessed section which is recessed in an axial direction and oblong in a circumferential direction providing an annular cavity, and the inlet and outlet recesses or openings in the secondary carrier ring are arranged, when in use, in radial flow communication with the at least one recessed section, and a full-length section is arranged in the primary carrier ring adjacent the recessed section, wherein the recessed section is disposed in the rim of the second axial end and terminates at an edge of the full-length section, the edge being positioned so as to provide an abrupt reduction in a radial dimension of the annular cavity resulting in an increase in pressure in front of or at the recess or opening for the barrier fluid in the secondary carrier ring.

2. The double mechanical seal as recited in claim 1, wherein the in an axial direction recessed section covers from about 60 to about 300 degrees of the rim of the second axial end of the carrier ring.

3. The double mechanical seal as recited in claim 1, wherein the at least one recessed section includes a plurality of recessed and oblong sections, and the primary carrier ring includes a full-length section arranged between the recessed sections.

4. The double mechanical seal as recited in claim 1, wherein the primary carrier ring is, when in use, supported directly to a pump housing by an O-ring.

5. The double mechanical seal as recited in claim 1, further including a gland with an inlet duct and an outlet duct for a barrier fluid.

6. The double mechanical seal as recited in claim 5, further comprising a pressure ring arranged to support at least one of the primary or secondary stationary seal rings from outside, the pressure ring having, for the barrier fluid, an inlet passage and an outlet passage in flow communication with the inlet duct and the outlet duct of the gland.

7. The double mechanical seal as recited in claim 6, wherein the recessed section is in flow communication with at least one of the inlet passage and the outlet passage of the pressure ring.

8. The double mechanical seal as recited in claim 5, wherein the recessed section terminates to an edge of a full-length section, the edge being positioned downstream of an opening to the outlet passage of the pressure ring.

9. A stationary seal ring for a double mechanical seal as recited in claim 1, the stationary seal ring comprising:
   a slide ring; and
   a carrier ring, the carrier ring having a first axial end with a seat for the slide ring and a second axial end with a rim opposite the first axial end, the stationary seal ring having an opening or recess configured to prevent the stationary seal ring from rotating, the rim of the second axial end having at least one in an axial direction recessed section and at least one full length section, the recessed section providing flow communication for barrier fluid and covering from about 60 to about 300 degrees of the rim of the carrier ring.

10. The stationary seal ring as recited in claim 9, wherein, at least one in an axial direction recessed section includes a plurality of recessed sections, and the full-length section is arranged between the recessed sections.

11. A pump housing in a centrifugal pump, the pump housing comprising:
   a rotationally symmetric opening for a shaft; and
   the double mechanical seal as recited in claim 1, at least one tooth-like protrusion extending from the pump housing inwardly into an opening for communicating, when in use, with at least one of the primary and secondary stationary seal rings of the double mechanical seal.

12. A double mechanical seal comprising:
   two pairs of seal rings having slide or seal surfaces, a first pair of the seal rings including a primary stationary seal ring and a primary rotary seal ring, a second pair of the seal rings including a secondary stationary seal ring and a secondary rotary seal ring; and
   at least one spring arranged and configured to push, when in use, the primary and the secondary stationary seal rings in opposite directions against the primary and secondary rotary seal rings, the primary stationary seal ring comprising a slide ring and a primary carrier ring, the primary carrier ring having a first axial end with a seat for the slide ring and a second axial end with a rim opposite the first axial end, and the secondary stationary seal ring comprising a slide ring and a secondary carrier ring, the secondary carrier ring having an inlet recess or opening and an outlet recess or opening for a barrier fluid, the primary carrier ring having at least one oblong opening in a circumferential direction, and an intact rim circumferentially at the location of the oblong opening and a recessed section disposed in the rim at the second axial end, and the inlet and outlet recesses or openings in the secondary carrier ring are arranged, when in use, in radial flow communication with the at least one oblong opening.

13. The double mechanical seal as recited in claim 12, wherein the primary carrier ring includes the oblong opening, and the oblong opening covers from about 60 to about 300 degrees of the circumference of the carrier ring.

14. The double mechanical seal as recited in claim 12, wherein the oblong opening is a single oblong opening extending circumferentially from the inlet recess or opening in the secondary carrier ring to the outlet recess or opening in the secondary carrier ring.

15. The double mechanical seal as recited in claim 12, wherein the at least one oblong opening includes a plurality of oblong openings.

16. The double mechanical seal as recited in claim 12, wherein the primary carrier ring is, when in use, supported directly by a pump housing by an O-ring.

17. The double mechanical seal as recited in claim 12, further including a gland with an inlet duct and an outlet duct for the barrier fluid.

18. The double mechanical seal as recited in claim 17, further comprising a pressure ring arranged to support at least one of the primary or secondary stationary seal rings from outside, the pressure ring having, for the barrier fluid, an inlet passage and an outlet passage in flow communication with the inlet duct and the outlet duct of the gland.

19. A stationary seal ring for a double mechanical seal, the stationary seal ring comprising:
   a slide ring; and
   a carrier ring, the carrier ring having a first axial end with a seat for the slide ring and a second axial end with a rim opposite the first axial end, the stationary seal ring having an opening or recess configured to prevent the stationary seal ring from rotating, the carrier ring having, at least one, in a circumferential direction, oblong opening, the oblong opening providing flow communication for a barrier fluid and extending from about 60 to about 300 degrees of the circumference of the carrier ring, and a recessed section disposed in the rim at the second axial end.

20. The stationary seal ring as recited in claim 19, wherein the at least one additional oblong opening includes a plurality of oblong openings, and a full-length section is arranged between the oblong openings.

21. A pump housing in a centrifugal pump, the pump housing comprising:
   a rotationally symmetric opening for a shaft;
   the double mechanical seal as recited in claim 12; and
   at least one tooth-like protrusion extending from the pump housing inwardly into an opening for communicating, when in use, with at least one primary and secondary seal rings of the double mechanical seal.

\* \* \* \* \*